(12) United States Patent
Bousquet et al.

(10) Patent No.: US 6,218,999 B1
(45) Date of Patent: Apr. 17, 2001

(54) ANTENNA SYSTEM, IN PARTICULAR FOR POINTING AT NON-GEOSTATIONARY SATELLITES

(75) Inventors: Jacques Bousquet, Croissy sur Seine; Pierre Menard, Argenteuil, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/403,988
(22) PCT Filed: Apr. 27, 1998
(86) PCT No.: PCT/FR98/00842
 § 371 Date: Oct. 29, 1999
 § 102(e) Date: Oct. 29, 1999
(87) PCT Pub. No.: WO98/49745
 PCT Pub. Date: Nov. 5, 1998

(30) Foreign Application Priority Data

Apr. 30, 1997 (FR) .................................................. 97 05407
Jun. 9, 1997 (FR) .................................................. 97 07100

(51) Int. Cl.$^7$ ...................................................... H01Q 3/00
(52) U.S. Cl. .......................... 343/765; 343/757; 343/840; 343/872
(58) Field of Search ..................... 343/761, 757, 343/758, 765, 766, 781 LA, 781 P, 781 R, 840, 872; H01Q 3/00

(56) References Cited

U.S. PATENT DOCUMENTS

| 2,408,825 | * | 10/1946 | Varian et al. | 343/765 |
| 3,893,123 | * | 7/1975 | Bieser | 343/706 |
| 4,791,428 | | 12/1988 | Anderson | 343/758 |
| 5,089,824 | * | 2/1992 | Uematsu et al. | 342/359 |
| 5,245,348 | | 9/1993 | Nishikawa et al. | 342/359 |
| 5,420,598 | * | 5/1995 | Uematsu et al. | 343/765 |

FOREIGN PATENT DOCUMENTS

| 0 579 407 A1 | 1/1994 | (EP) . |
| 0 600 699 A1 | 6/1994 | (EP) . |
| 0 707 356 A1 | 4/1996 | (EP) . |
| WO 88/09066 | 11/1988 | (WO) . |

* cited by examiner

*Primary Examiner*—Tho Phan
(74) *Attorney, Agent, or Firm*—Sughrue, Mion, Zinn, Macpeak & Seas, PLLC

(57) ABSTRACT

The invention concerns an antenna system including at least two antennas (10, 11), each of said antennas (10, 11) being capable of pointing independently of the other(s) in any direction within a solid angle. According to the invention, the antennas (10, 11) are mounted on a common support (17) co-operating with rotation means (18) for rotating the common support (17), the rotation means (18) being activated to prevent masking of one of the antennas (10, 11) by another of the antennas (10, 11). The invention applies in particular to tracking non-geostationary satellites.

20 Claims, 2 Drawing Sheets

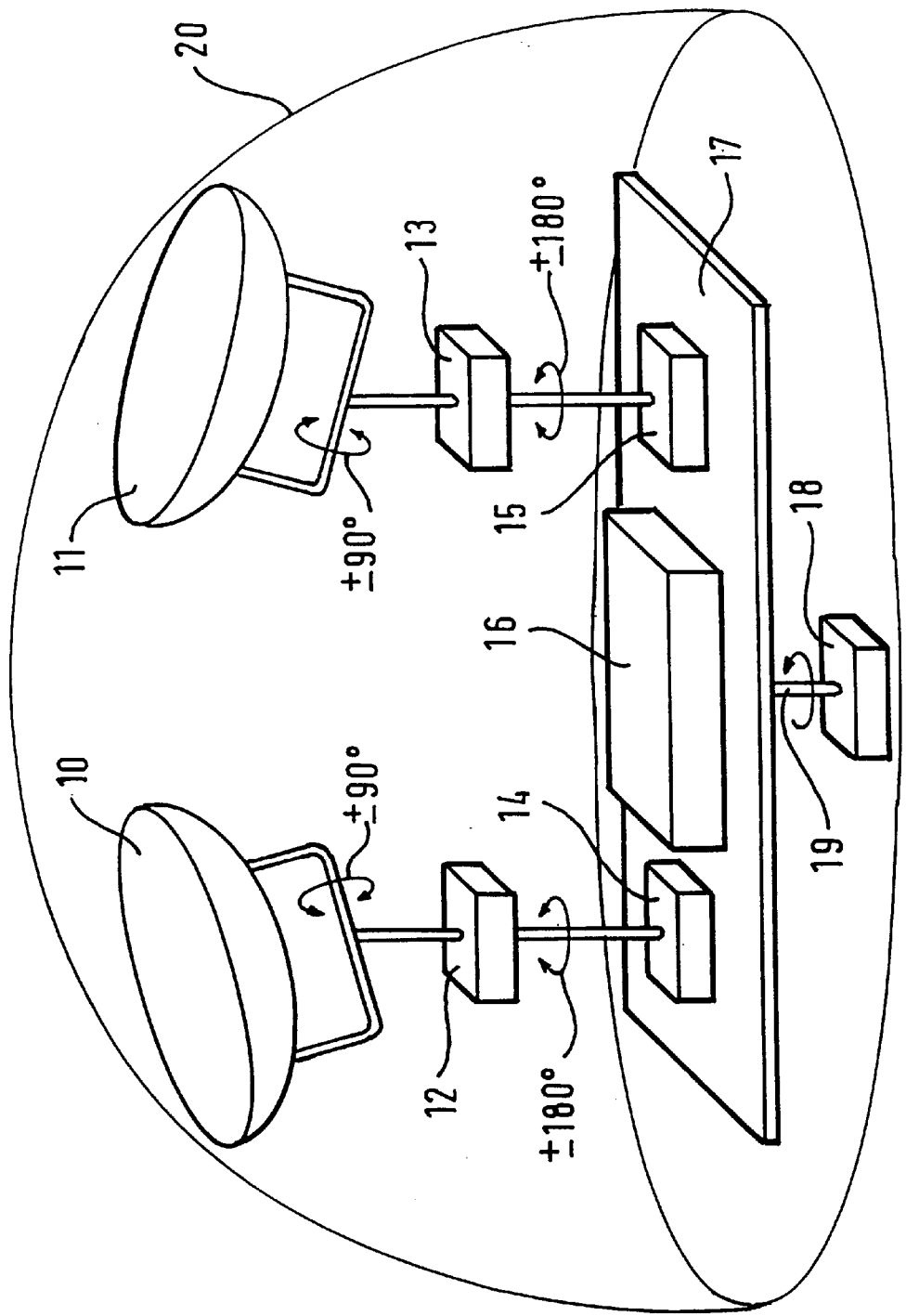

ANTENNA SYSTEM, IN PARTICULAR FOR POINTING AT NON-GEOSTATIONARY SATELLITES

BACKGROUND OF THE INVENTION

The field of the invention is that of antenna systems, in particular for pointing at non-geostationary satellites. To be more precise, the present invention concerns a system with at least two antennas capable of pointing independently of each other in any direction within a solid angle.

In the context of the present invention, a terrestrial transmission system is considered, e.g. as installed on the roof of a building. The system includes at least two antennas, for example parabolic antennas, designed to communicate with, i.e. to transmit to and/or receive from, non-geostationary satellites. The antennas are close together (i.e. co-located) for reasons of overall size and/or to reduce the lengths of the connections to a single modem and/or so that they can be located under the same protective radome. The two antennas can be steered independently of each other in azimuth and in elevation, i.e. each is mounted on a separate support.

The problem that arises with a system of the above kind is that one antenna may mask the other antenna(s), as shown in FIGS. 1 and 2, because of the position of the satellites, and in particular when their elevation is low. The antennas are considered to be located in the same horizontal plane, i.e. at the same height.

In FIG. 1, which is a simplified plan view of a system with two co-located parabolic antennas, the two antennas 10 and 11 are pointing in opposite directions and neither of them can transmit or receive signals because they mask each other. In FIG. 2, the antennas 10 and 11 are pointing in the same direction and the antenna 11 is therefore masking the antenna 10.

To avoid such masking, it is possible to move the antennas a greater distance apart, the requirements for compactness are then no longer satisfied. Also, it is no longer possible to protect them by a common radome.

One object of the present invention is to remedy the above drawbacks.

SUMMARY OF THE INVENTION

To be more precise, one object of the invention is to provide an antenna system including at least two antennas each of which is capable of pointing independently of the other(s) in any direction within a solid angle, the system enabling the antennas to be colocated without masking each other.

The above object, and others that become apparent below, are achieved by an antenna system including at least two antennas, each of the antennas being capable of pointing independently of the other(s) in any direction within a solid angle, the system being characterized in that the antennas are mounted on a common support cooperating with rotation means for rotating the common support, the rotation means being activated to prevent masking of one of the antennas by another of the antennas.

Rotation of the common support enables the antennas to be disposed beside each other for aiming in the same direction or opposite directions.

The antennas used can be circular or elliptical parabolic antennas, i.e. passive antennas, or active antennas made up of patches.

The rotation means are preferably adapted for rotation of ±45° relative to a median position.

The antenna system is advantageously covered by a radome and the invention applies in particular to tracking non-geostationary satellites.

BRIEF DESCRIPTION OF THE DRAWINGS

Other features and advantages of the invention become apparent in the course of the following description of a preferred embodiment of the invention which is given by way of illustrative and non-limiting example only and with reference to the accompanying drawings, in which:

FIG. 3 shows an antenna system according to the present invention.

DETAIL DESCRIPTION OF THE INVENTION

Figure 1:
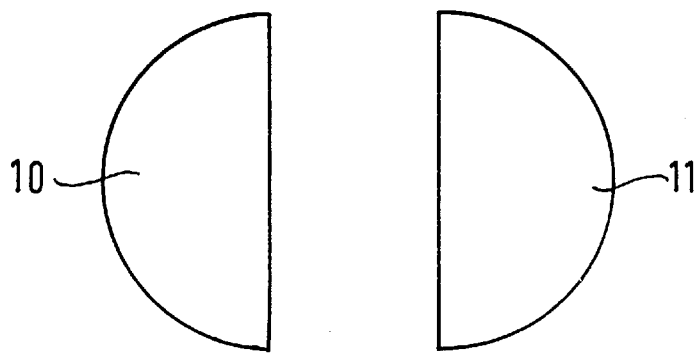
FIGS. 1 and 2 are simplified plan views of a system with two co-located parabolic antennas.
Figure 2:
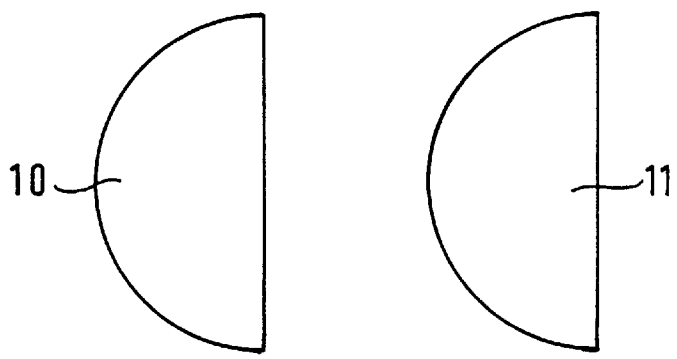

FIGS. 1 and 2 have already been described in connection with the prior art.

FIG. 3 shows an antenna system in accordance with the present invention. Here there are two circular parabolic antennas (10 and 11). Each antenna is mounted on a support and can be pointed independently of the other in any direction within a solid angle by means of elevation positioning means 12, 13 (each of which can rotate the antenna with which it co-operates by ±90° in elevation, for example) and azimuth positioning means 14, 15 (each of which can rotate the antenna with which it co-operates by ±180° in azimuth, for example). Common transmit/receive means 16 are connected to the antennas 10 and 11.

According to the invention, the antennas 10 and 11 are mounted on a common support 17 co-operating with means 18 for rotating the common support 17. To be more precise, the azimuth positioning means 14, 15 of the antennas 10 and 11 are here mounted on the common support 17. The rotation means 18 are activated to prevent one antenna masking the other antenna. For example, the rotation means comprise a motor coupled directly to a shaft 19 fixed to the common support 17. The common support 17 is rotated through ±45° relative to a median position when future impediment of one antenna by the other antenna is predicted, for example. The prediction can be based on analyzing the ephemeris or on analyzing data from encoders which encode the positions of the antennas 10 and 11. This automatically assures that neither antenna is ever masked by the other antenna, whether they are facing in substantially opposite directions (FIG. 1) or in substantially the same direction (FIG. 2).

The antennas can equally well be active antennas.

The invention enables the antenna system to be placed under a common protective radome 20, which then has a compact overall size.

Figure 4:
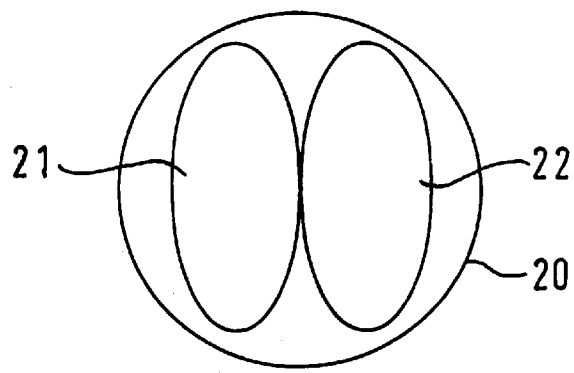
FIG. 4 is a simplified plan view of an antenna system of the invention including elliptical antennas.

To limit further the overall size of the antenna system of the invention, the antennas can be oval or elliptical, as shown in FIG. 4. This figure is a simplified plan view of the antenna system of the invention with the antennas 21 and 22 under the radome 20 aimed at the zenith. The surface areas of the antennas 21 and 22 are equal to those' of the antennas 10 and 11, in order to provide the same performance. The radome 20 is smaller (around 20% smaller) than that shown in FIG. 3.

The invention applies in particular, although not exclusively, to tracking non-geostationary satellites.

What is claimed is:

1. An antenna system including at least two antennas (10, 11, 21, 22), each of said antennas (10, 11, 21, 22) configured to operate independently in any direction within a solid angle, wherein said antennas (10, 11, 21, 22) are mounted on a common support (17) co-operating with rotation means (18) for rotating said common support (17), said rotation means (18) being activated to prevent masking of one of said antennas (10, 11, 21, 22) by another of said antennas (10, 11, 21, 22).

2. A system according to claim 1, wherein said antennas (10, 11, 21, 22) are parabolic antennas.

3. A system according to claim 1, wherein said antennas are active antennas.

4. A system according to claim 1, wherein said rotation means (18) is configured to effect a rotation of ±45° relative to a median position.

5. A system according to claim 1, wherein said antennas are covered by a radome (20).

6. A system according to claim 1, wherein said antennas (21, 22) are elliptical.

7. A system according to claim 1, wherein said antennas are configured to track non-geostationary satellites.

8. The system of claim 1, wherein said rotating means positions said common support in response to data indicative of relative rotational positions of said antennas.

9. The system of claim 1, wherein said rotating means operates in response to location data that forecasts a masking event.

10. A method for communicating with a non-geostationary object, comprising:

orienting a plurality of antennas with respect to the non-geostationary object, said plurality of antennas attached to a common base, the pointing direction of said antennas being controllable independently of each other;

generating a location data indicative of relative positions of each of said plurality of antennas with respect to one another; and positioning said common base in response to said location data to substantially eliminate masking.

11. The method of claim 10, wherein said generating step comprises analyzing information indicative of relative rotational positions of the antennas to generate the location data.

12. The method of claim 11, wherein said information indicative of relative rotational positions is obtained by analyzing one of an ephemeris and encoded positional data from said plurality of antennas.

13. The method of claim 10, further comprising forecasting a masking event of at least one of said plurality of antennas by another of said plurality of antennas to generate the location data, wherein the location data is a prediction.

14. The method of claim 10, further comprising adjusting azimuth and elevation of said plurality of antennas.

15. The method of claim 10, wherein said plurality of antennas is covered by a single radome.

16. The method of claim 10, wherein the positioning step includes rotating the common base ±45° relative to a prescribed position.

17. The method of claim 10, wherein said plurality of antennas is parabolic.

18. The method of claim 10, wherein said plurality of antennas is active.

19. The method of claim 10, wherein said plurality of antennas is elliptical.

20. The method of claim 10, wherein a rotating means positions said common base.

* * * * *